US012588970B2

(12) United States Patent
Lasky, II

(10) Patent No.: US 12,588,970 B2
(45) Date of Patent: Mar. 31, 2026

(54) SURGICAL GUIDE WITH MATING CONNECTORS

(71) Applicant: Michael Jon Lasky, II, Saint Louis, MO (US)

(72) Inventor: Michael Jon Lasky, II, Saint Louis, MO (US)

(73) Assignee: Journey Dental Lab LLC, Saint Charles, MO (US)

( * ) Notice: Subject to any disclaimer, the term of this patent is extended or adjusted under 35 U.S.C. 154(b) by 195 days.

(21) Appl. No.: 18/466,380

(22) Filed: Sep. 13, 2023

(65) Prior Publication Data

US 2024/0081948 A1 Mar. 14, 2024

Related U.S. Application Data

(60) Provisional application No. 63/375,411, filed on Sep. 13, 2022.

(51) Int. Cl.
A61C 1/08 (2006.01)

(52) U.S. Cl.
CPC ................................... A61C 1/084 (2013.01)

(58) Field of Classification Search
CPC ...................................................... A61C 1/084
See application file for complete search history.

(56) References Cited

U.S. PATENT DOCUMENTS

| | | | | |
|---|---|---|---|---|
| 8,764,441 | B2 * | 7/2014 | Polley | A61B 17/666 606/86 R |
| 9,066,734 | B2 * | 6/2015 | Schoenefeld | A61B 17/1757 |
| 9,517,145 | B2 * | 12/2016 | Meridew | A61B 17/1746 |
| 11,109,942 | B2 | 9/2021 | Groscurth et al. | |
| 11,160,639 | B2 | 11/2021 | Palmer | |
| 11,173,016 | B2 | 11/2021 | Watson | |
| 11,207,153 | B2 | 12/2021 | Suttin et al. | |
| 11,213,367 | B2 | 1/2022 | Llop | |
| 11,344,383 | B2 | 5/2022 | Jusuf et al. | |
| 2012/0214130 | A1 * | 8/2012 | Krivoruk | A61C 13/0001 433/173 |
| 2014/0272780 | A1 * | 9/2014 | Llop | A61C 1/084 433/173 |
| 2016/0278878 | A1 | 9/2016 | Watson et al. | |
| 2017/0296307 | A1 * | 10/2017 | Simmons | A61C 1/084 |
| 2018/0280121 | A1 | 10/2018 | Zhang et al. | |
| 2019/0223988 | A1 * | 7/2019 | Palmer | A61C 1/084 |
| 2019/0314114 | A1 | 10/2019 | Watson | |
| 2019/0336245 | A1 * | 11/2019 | Liacouras | A61C 13/0004 |
| 2019/0350675 | A1 | 11/2019 | Plonnigs et al. | |
| 2019/0374305 | A1 * | 12/2019 | Wang | A61C 1/084 |
| 2020/0015934 | A1 | 1/2020 | Llop et al. | |
| 2020/0306144 | A1 | 10/2020 | Jusuf et al. | |
| 2020/0352736 | A1 | 11/2020 | Van Rensburg et al. | |
| 2021/0386513 | A1 | 12/2021 | Kofron et al. | |
| 2022/0160460 | A1 | 5/2022 | Li et al. | |
| 2024/0216109 | A1 * | 7/2024 | Crockett | A61C 8/0048 |

* cited by examiner

*Primary Examiner* — Nicholas D Lucchesi
(74) *Attorney, Agent, or Firm* — Dunlap Bennett & Ludwig PLLC; Anna L. Kinney

(57) ABSTRACT

A dental implant surgical guide assembly includes a first arcuate guide defining sockets and a second arcuate guide having protrusions. The protrusions are mated to the sockets and the protrusions are longitudinally aligned with the sockets. The surgical guide assembly has a secure, close-to friction-fit with mating connectors having a particular geometry, simplifying the overall guide design.

12 Claims, 3 Drawing Sheets

SURGICAL GUIDE WITH MATING CONNECTORS

CROSS-REFERENCE TO RELATED APPLICATION

This application claims the benefit of priority of U.S. provisional application No. 63/375,411, filed Sep. 13, 2022, the contents of which are herein incorporated by reference.

BACKGROUND OF THE INVENTION

The present invention relates to oral implant surgery and, more particularly, to a surgical guide with mating connectors.

Dental implant procedures are an effective method of restoring both form and function in patients with compromised or missing teeth. A dental implant surgical guide ensures proper placement of the dental implant or implants with potential to assist with placement of a prosthesis. More complex surgical guides utilize small screws or pins to temporarily connect multiple pieces together. Anchor pins or fixation screws are used to fixate surgical templates to supporting bone surfaces.

Currently available surgical guides are deficient with respect to price and safety. They generally require repeatedly inserting and taking out metal pins, slowing the procedure. The pins may also be dropped on the floor and/or lost. If the provider loses a metal pin, the stability of the guide could be compromised. Metal pins are also dangerous if they accidentally enter the patient's airway. Existing guides also seat directly on the bone or immediately adjacent thereto, interfering with visibility of the anatomy and making irrigation challenging.

As can be seen, there is a need for a surgical guide that does not utilize tiny metal pins to connect guide pieces together.

SUMMARY OF THE INVENTION

In one aspect of the present invention, a dental implant surgical guide assembly comprises a first arcuate guide defining sockets and a second arcuate guide having protrusions mated to the sockets, wherein the sockets are longitudinally aligned with the protrusions.

The present invention provides a surgical guide utilizing a secure, close-to friction-fit with mating connectors having a particular geometry, simplifying the overall guide design. The connectors fit securely to lock two pieces together and are self-retaining as is or with water to allow for a smooth draw, while still being easy to separate. This eliminates the need to remove and place multiple small, hard to handle metal pins to connect additional surgical components to the bone supported guide.

The inventive guide improves safety by eliminating the metal pins that otherwise may easily be swallowed by the patient or enter their lungs during surgery. The guide also eliminates latches to lock the two pieces together as they are self-retaining with or without water to allow for a smooth draw.

Eliminating the tedious process of placing and removing multiple, tiny metal pins speeds up the surgery and minimizes the time the patient needs to be under anesthesia, reducing risk to the patient. It reduces points of failure that may otherwise occur due to dropping or losing a metal pin that would be important to connecting the guides, leading to guide instability. It improves cost by eliminating the need to purchase extra parts as well as the man-hours associated with fitting and finishing the guide to properly hold the metal guide pins. Cheaper guides make dental implants more accessible to patients.

The surgical guide and the platform reduction guide disclosed herein form a gap therebetween when assembled. As a result, relative to prior art guides discussed above, irrigation is much easier with the guide assembly disclosed herein. The resulting increased irrigation keeps the bone cool and thereby protects it from heat damage. The guide assembly also allows for greater visibility of surgical drills and implants as they contact the underlying bone.

These and other features, aspects and advantages of the present invention will become better understood with reference to the following drawings, description, and claims.

DETAILED DESCRIPTION OF THE INVENTION

Figure 1:
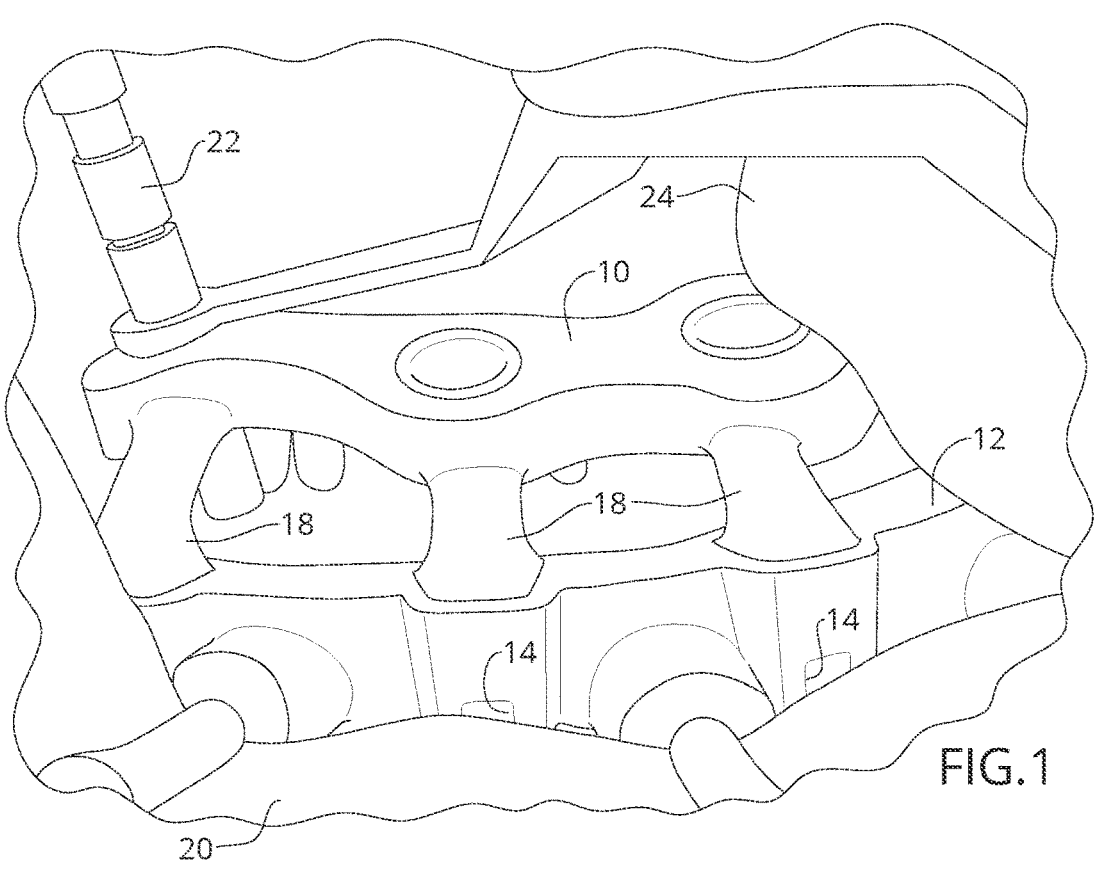
FIG. 1 is a perspective view of an oral implant guide according to an embodiment of the present invention, shown in use.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is an oral implant guide with a male-to-female connection that securely fits together without a pin or latch.

The male and female connection generally utilizes an isosceles trapezoid shape that has a very small angle divergence (e.g., between about 0.1 and 10 degrees) and minimal space between the two (e.g., less than about 1 mm). They may fit together with friction or may secure together with water. The shallow angle divergence and minimal space between the two parts allows for secure fit, dry or wet. The connector components may have rounded edges and corners.

The male-to-female connection may be utilized by many different devices, depending on patient needs. Several male-to-female connections may be provided in a single surgical appliance depending, for example, on spacing or stability. The surgical appliance may comprise a bone-supported guide with additional surgical components indexed thereto.

The female receiver may have an outward-facing (i.e., facial, buccal) irrigation port. The irrigation port enables the provider to cleanse the female receiver connection of any debris to ensure a very intimate fit. The port also enables excess water to exit the female connection when indexing the male component.

The inventive guide may be manufactured by any suitable method, such as 3D printing or milling. Preferably, the guide may be manufactured via 3D printing. Computer aided design—computer aided manufacturing (CAD-CAM) software may be used to align the geometries of surgical components. The male and/or female connection sizes may be adjusted to match patient anatomy, to accommodate spacing restrictions, and/or for physical manufacturing tolerances. The connector components may be adjusted to be shorter or taller and/or wider or narrower, with minor angle adjustments to match each patient individually and to meet the manufacturing minimum tolerances.

The male connection components may have a leg spacing the connector component from a longitudinal body, configured to form a gap between the bone reduction guide and the surgical guide, such as a vertical spacing between longitudinal components of the bone reduction guide and the surgical guide. The vertical spacing may be greater than 1 mm. For example, the gap between the guides may be at least about 2 mm, at least about 3 mm, at least about 4 mm, at least about 5 mm, at least about 6 mm, at least about 7 mm, at least about 8 mm, or at least about 9 mm. In some embodiments, the gap between guides may be between about 2 mm and about 10 mm.

The guide assembly disclosed herein may be manufactured of any suitable material, such as a carbon-based polymer or a silicon-based polymer.

In some embodiments, a platform or bone reduction guide may have female sockets, while connecting components, such as a seating jig and a surgical guide, may have male protrusions mated to the female sockets.

In alternate embodiments, a platform or bone reduction guide may have male protrusions, while connecting components, such as a seating jig and a surgical guide, may have female sockets mated to the male protrusions.

Without limiting the scope of the present invention, the male-to-female connected surgical apparatus, also referred to herein as the isosceles platform bone reduction guide, may be used during oral surgery on a patient's maxilla or mandible as described in the following example. A pin guide to predrill the bone fixation pins and/or a seating device may be used to ensure the correct positioning of a bone platform foundation guide. This seating device may be removed after the platform is secured to the bone. Once the platform is anchored in place utilizing the doctor's pre-determined choice of fixation pins or screws, any anatomy including teeth or bone superior to the flat plane atop the platform guide may be removed. A surgical guide utilizing the isosceles platform connection may be indexed to the platform foundation. Water may be applied to cleanse the connections via the outward-facing ports to easily remove any debris present due to the removal of anatomy. The provider may drill osteotomies, place implants, and suture gingiva according to methods well known in the art.

Figure 2:
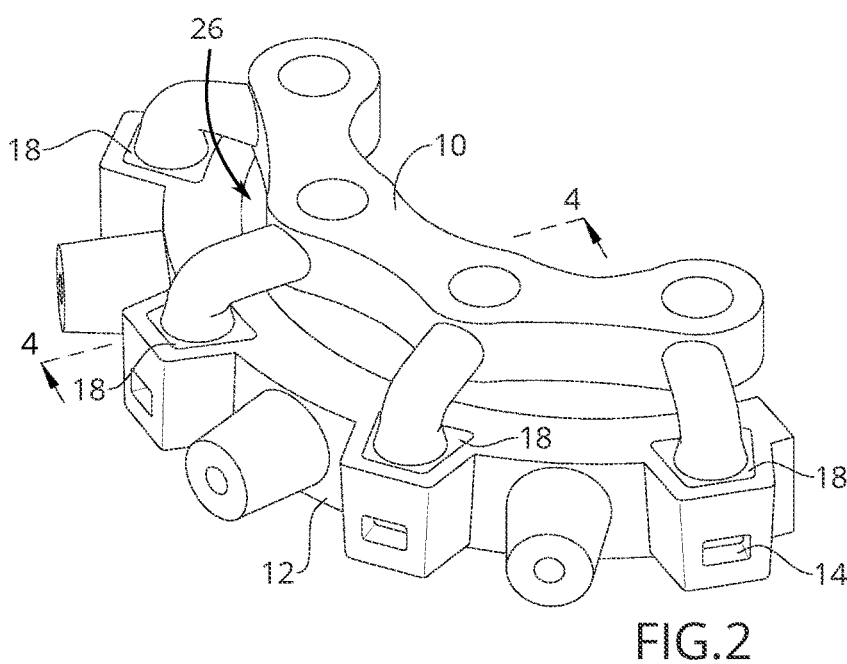
FIG. 2 is another perspective view thereof.
Figure 3:
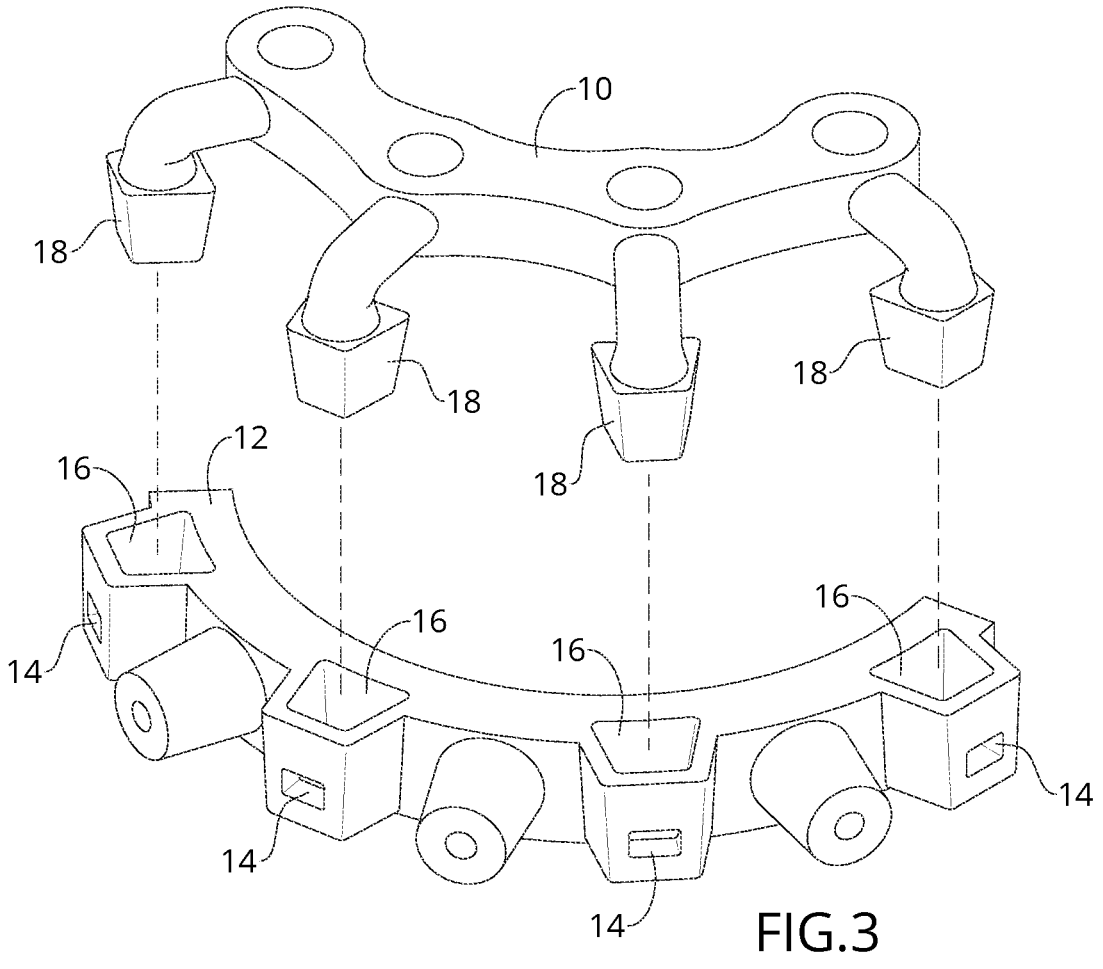
FIG. 3 is an exploded view thereof.
Figures 4, 5, 6:
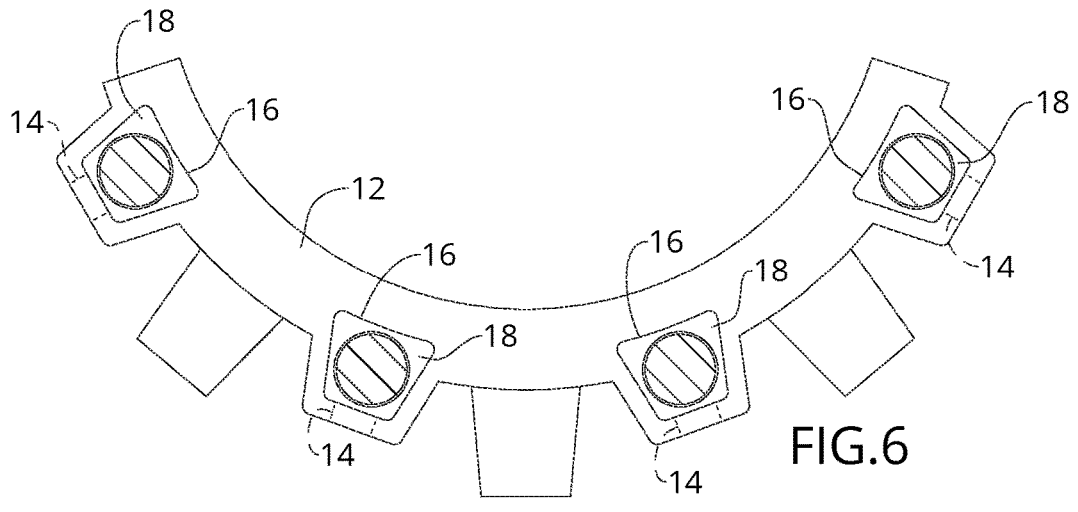
FIG. 4 is a sectional view thereof, taken along line 4-4 in FIG. 2.
FIG. 5 is another sectional view thereof.
FIG. 6 is a sectional view taken along line 6-6 in FIG. 4.

Referring to FIGS. 1 through 6, FIG. 1 shows an oral implant guide placed in a patient's mouth 20. The guide comprises a male connector body 10 having male connectors 18 and a female connector body 12 having irrigation ports 14. As shown, the surgeon 24 may operate a drill 22 to perform an osteotomy through apertures in the male connector body 10, enabling accurate placement of a surgical implant.

As FIGS. 3 through 6 illustrate, the female connector body 12 has female connectors 16 defined therein that snugly accommodate the male connectors 18 of the male connector body 10. The female connectors 16 directly fluidly communicate with the irrigation ports 14. A space or gap 26 between the female connector body 12 and the male connector body 10 enables superior irrigation and visibility of surgical drills and implants as they enter the patient.

It should be understood, of course, that the foregoing relates to exemplary embodiments of the invention and that modifications may be made without departing from the spirit and scope of the invention as set forth in the following claims.

What is claimed is:

1. A dental implant surgical guide assembly, comprising:
a first arcuate guide defining sockets; and
a second arcuate guide having protrusions mated to the sockets;
wherein the sockets are longitudinally aligned with the protrusions;
wherein the sockets and protrusions have, in sagittal cross-section, a substantially isosceles trapezoid shape; and
wherein the sockets and protrusions are configured to be self-retaining through friction forces.

2. The dental implant surgical guide assembly of claim 1, wherein the protrusions and sockets have rounded edges and corners.

3. The dental implant surgical guide assembly of claim 1, wherein the substantially isosceles trapezoid shape has tapered walls with an angle divergence between about 0.1 and 10 degrees.

4. The dental implant surgical guide assembly of claim 1, wherein the protrusions and sockets have less than about 1 mm therebetween when coupled.

5. The dental implant surgical guide assembly of claim 1, wherein the first arcuate guide is a bone reduction guide and the second arcuate guide is a surgical guide.

6. The dental implant surgical guide assembly of claim 5, wherein the bone reduction guide further defines fastener apertures between adjacent positions of the sockets and having a perpendicular axial configuration to the sockets.

7. The dental implant surgical guide assembly of claim 5, wherein the bone reduction guide further defines an irrigation port at a facial aspect of each socket, wherein the irrigation port remains unobstructed when the protrusions are seated within the sockets.

8. The dental implant surgical guide assembly of claim 1, wherein the first arcuate guide is a surgical guide and the second arcuate guide is a bone reduction guide.

9. The dental implant surgical guide assembly of claim 1, wherein the second arcuate guide defines drill apertures, proximal to the protrusions, having a parallel axial configuration, wherein the drill apertures are configured to accommodate a surgical drill.

10. The dental implant surgical guide assembly of claim 9, wherein the protrusions are configured to extend laterally from the drill apertures to a position that aligns the drill apertures with a patient's bone tissue.

11. The dental implant surgical guide assembly of claim 1, wherein the protrusions have a length sufficient to form a gap of greater than 1 mm between the first arcuate guide and the second arcuate guide.

12. The dental implant surgical guide assembly of claim 1, wherein each protrusion defines a continuous, uninterrupted structure from its base on the second arcuate guide to its mating surface.

* * * * *